United States Patent
Schrader et al.

(10) Patent No.: US 6,257,354 B1
(45) Date of Patent: Jul. 10, 2001

(54) DRILLING FLUID FLOW MONITORING SYSTEM

(75) Inventors: Hartmut Schrader, Nienhagen; Frank Reiber, Didderse, both of (DE)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/197,300

(22) Filed: Nov. 20, 1998

(51) Int. Cl.[7] .................................................. E21B 21/08
(52) U.S. Cl. ................................................ 175/38; 175/48
(58) Field of Search .................... 175/38, 48; 73/152.21, 73/152.04, 152.29, 152.31, 277, 204.11, 148, 152.23, 152.33, 152.35, 861.08, 861.18, 196, 295, 304 R, 306, 311, 291, 866.5, 204.21, 861.24

(56) References Cited

U.S. PATENT DOCUMENTS

| | | | |
|---|---|---|---|
| 3,002,379 | * 10/1961 | Hurley | 73/152.21 |
| 3,602,322 | * 8/1971 | Gorsuch | 175/48 |
| 3,608,653 | 9/1971 | Rehm | 175/25 |
| 3,613,806 | 10/1971 | Malott | 175/48 |
| 3,726,136 | 4/1973 | McKean et al. | 73/155 |
| 3,760,891 | * 9/1973 | Gadbois | 175/48 |
| 3,833,076 | * 9/1974 | Griffin, III | 175/38 |
| 4,086,457 | * 4/1978 | Niedermeyer | 200/84 R |
| 4,290,305 | 9/1981 | Gibson et al. | 73/155 |
| 4,295,366 | 10/1981 | Gibson et al. | 73/155 |
| 4,440,239 | * 4/1984 | Evans | 175/5 |
| 4,520,666 | 6/1985 | Coblentz et al. | 73/155 |
| 4,535,851 | 8/1985 | Kirkpatrick et al. | 175/38 |
| 4,876,887 | 10/1989 | Mickler | 73/204.11 |
| 5,063,776 | * 11/1991 | Zanker et al. | 73/155 |
| 5,108,193 | 4/1992 | Furubayashi | 374/164 |
| 5,168,932 | * 12/1992 | Worrall et al. | 166/336 |
| 5,226,333 | 7/1993 | Hess | 73/155 |
| 5,230,245 | 7/1993 | Kamiunten et al. | 73/195 |
| 5,237,866 | 8/1993 | Nijdam | 73/204.11 |
| 5,353,873 | 10/1994 | Cooke, Jr. | 166/253 |
| 5,509,474 | 4/1996 | Cooke, Jr. | 166/64 |
| 5,685,194 | 11/1997 | McCulloch et al. | 73/295 |
| 5,814,780 | * 9/1998 | Batchelder et al. | 200/84 R |

FOREIGN PATENT DOCUMENTS

2024895A * 1/1978 (GB) ..................................... 175/48

* cited by examiner

Primary Examiner—Thomas B. Will
Assistant Examiner—Meredith C. Petravick
(74) Attorney, Agent, or Firm—Madan, Mossman & Sriram, PC

(57) ABSTRACT

The present invention provides a fluid flow measurement system for an oil well drilling system that includes a supply of drilling fluid to a wellbore under pressure and a return line carrying fluid leaving the wellbore during drilling of the wellbore. The system includes at least one floating sensor in the return line that provides a measure of the velocity of the fluid in the return line. The sensor may be a thermal sensor, an electromagnetic sensor or an ultrasonic sensor. A height sensor provides the fluid level in the return line and a density sensor provides the density of the returning fluid. A controller determines the inflow rate and out flow rate of the drilling fluid and further determines the presence of a kick and wash out from the flow rates. The system also determines the operating condition of the pumps supplying fluid to the wellbore.

21 Claims, 7 Drawing Sheets

DRILLING FLUID FLOW MONITORING SYSTEM

BACKGROUND OF THE INVENTION

1. Field of the Invention

This invention relates generally to oil well drilling systems and more particularly to a drilling fluid flow monitoring and control system for use during drilling of wellbores.

2. Description of the Related Art

Oilfield wellbores are formed by rotating a drill bit carried at an end of a drill string. The drill string is comprised of a tubing which may be drill pipe made of jointed sections or a continuous coiled tubing and a drilling assembly that has a drill bit at its bottom end. The drilling assembly is attached to the bottom end of the tubing. To drill a wellbore, the drill bit is rotated by a mud motor carried by the drilling assembly and/or by rotating the drill pipe. A drilling fluid, also referred to as the "mud," is pumped under pressure from a source at the surface (mud pit) through the tubing. The mud serves a variety of purposes. It is designed to provide the hydrostatic pressure that is greater than the formation pressure to avoid blow outs. The mud drives the drilling motor (when used) and it also provides lubrication to various elements of the drill string. Commonly used drilling fluids are either water-based or oil-based fluids. They also contain a variety of additives which provide desired viscosity, lubricating characteristics, heat, anti-corrosion and other performance characteristics.

The mud discharges at the bottom of the drill bit and returns to the surface via the annular space between the tubing and the wellbore inside (also referred to herein as the "annulus"). One of the primary functions of the drilling fluid is the control of the formation pressure. The hydrostatic pressure exerted by the mud column is the primary method of controlling the pressure of the formation. Whenever the formation pressure exceeds the pressure exerted by the fluid column, formation fluid enters the wellbore, causing a "kick." For the purpose of this invention, a kick is defined as any unscheduled entry of formation fluid into the wellbore. Early detection of kicks and prompt initiation of control procedures are keys to successful well control. If a kick is not detected early enough or controlled properly when detected, a blowout can occur. One method to determine the presence of a kick is to accurately determine the amount of the drilling fluid being supplied to the drill string and the amount of the fluid returning to the surface. Gain in the fluid quantity is an indicia of a kick. During the drilling of a wellbore, a certain amount of the drilling fluid is lost because it penetrates into the formation. However, excessive loss of fluid can be an indicia of wash outs.

Fluid flow measurements are made at the surface for determining the amount of the drilling fluid entering the drill string and the drilling fluid returning to the surface. Such measurements are then used to determine certain operating parameters, such as kick, fluid loss etc. There are two modes relating to the pumping of the drilling fluid into the well: (1) pumping fluid by main mud pumps through the drill string during the drilling operation, and (2) pumping fluid by a secondary into the annulus during tripping operation when the main mud pump is inactive. Fluid is pumped in the latter case to compensate for the reduction in the volume due to the removal of the drill pipe and to ensure the maintenance of the required hydrostatic pressure. A common method to determine out flow (flow rate of the returning fluid) is to install a flow sensor in a bypass line made from the main return line. Solids from the returning fluid tend to settle in the bypass line, which frequently inhibits the measurements. Electromagnetic sensors are commonly used to determine the flow of the fluids. Such sensors provide relatively accurate measurements for water-based drilling fluids. For oil-based muds, especially muds containing a relatively high percentage of oil, such sensors do not provide accurate measurements. Other commercially available sensors have not gained much use in oilfield applications because they are either prohibitively expensive or do not provide accurate measurements. The present invention addresses some of the problems with the flow measurement apparatus and methods and provides a prior art flow measurement system that provides relatively accurate measurements for any type of drilling fluid, including oil-based and water-based muds. The present invention also provides novel sensor arrangements for determining fluid flow rates.

SUMMARY OF THE INVENTION

The present invention provides a fluid flow measurement system for an oil well drilling system that includes an inflow line for supplying drilling fluid to the wellbore and pressure and a return line carrying fluid leaving the wellbore during drilling of such wellbore. The system includes at least one floating sensor assembly in the return line having a flow rate sensor that provides a measure of the velocity of the fluid in the return line. The flow rate sensor may be a thermal sensor, an electromagnetic sensor or an ultrasonic sensor. A height sensor provides the fluid level in the return line and a density sensor provides the density of the returning fluid.

The sensor assembly includes a floating carrier or vessel that carries the flow rate sensor. The assembly is mounted about a pivot point that enables the carrier to float on the fluid. A counter weight to the carrier reduces the negative affect on the measurements due to turbulence in the fluid. Multiple sensors are preferably used to improve the accuracy of the measurements.

The flow rate sensor may be a thermal sensor, an electromagnetic sensor or an ultrasonic sensor. The probe of the thermal sensor or the electromagnetic sensor remains in contact with the fluid while taking measurements. The ultrasonic sensor includes a transmitter and a receiver and a reflector. The transmitter and receiver remain above the fluid line, while the reflector remains in the fluid during the taking of the measurements.

The system includes a pump that pumps drilling fluid into the wellbore via the inflow line. A flow rate sensor in the in flow line provides the flow rate of the drilling fluid supplied to the wellbore. This sensor may be a thermal sensor, an electromagnetic sensor or an ultrasonic sensor or any other suitable sensor. The floating sensors in the system are preferably side mounted.

A controller in the system determines from the sensor measurements the flow rate of the fluid entering the wellbore, flow rate of the fluid leaving the wellbore and the mud density. The system is programmed to determine the presence of a kick and wash out from the inflow and the out flow measurements. The system also determines from the inflow a measure of the operating condition of the pump.

Additionally, the present invention utilizes flow measurement sensors to determine the amount of fluid pumped into the wellbore by a secondary pump during tripping operations while the main mud pumps are inactive. The present invention further utilizes multiple flow rate sensor in a substantially horizontal flow line between the mud pumps and the wellbore and determines therefrom the volume of the three phase mixture (liquid, gas and solids in such line).

Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals and wherein.

DETAILED DESCRIPTION OF THE PREFERRED EMBODIMENTS

The present invention provides a closed loop drilling fluid flow measurement system. The system provides relatively accurate fluid flow measurements regardless of the type of the drilling fluid or mud used for drilling the wells. The present invention also provides novel sensor arrangements for determining the flow rate of the drilling fluids.

Figure 1:
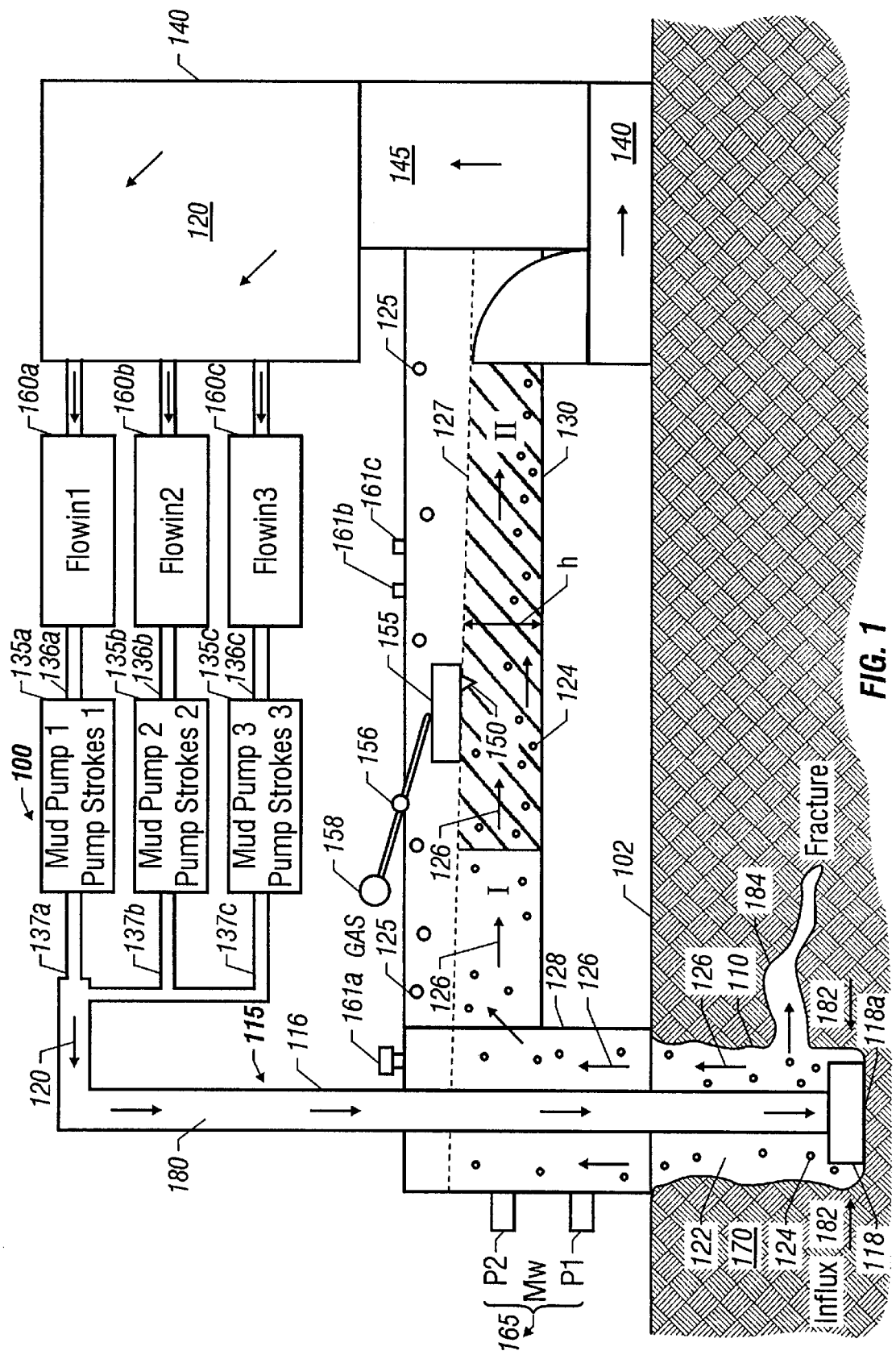
FIG. 1 is a schematic diagram of a drilling fluid flow measurement system for use during the drilling of a wellbore.

FIG. 1 is a schematic elevational diagram of a drilling fluid flow system 100. The system 100 shown includes a drill string 115 that includes a tubing 116 that has a drill bit 118 at its bottom end. To drill the wellbore 110, a drilling fluid 120 is pumped from a source (pit) 140 into the tubing 116 by one or more mud pumps 135*a*–135*c*. The drill bit 118 is rotated by a mud motor (not shown) and/or by rotating the tubing 116 at the surface by a suitable motor (not shown). The drill bit 118 cuts the rock into small fragments 124 (referred to in the art as the "cuttings"). The drilling fluid 120 discharges at the drill bit bottom 118*a* and returns to the surface 102 via the annular space 122 (also referred to as the annulus) carrying the cuttings 124. The returning drilling fluid is denoted by the numeral 126.

The returning drilling fluid 126 passes into a riser 128, and then into a generally horizontal out flow or return line 130. The flow line 130 has a sufficiently large cross-sectional area, which allows the returning fluid 126 to flow without filling the entire outflow line 130. In FIG. 1, the fluid 126 is shown flowing at level 127 having a height of "h". This leaves sufficient area above the fluid level 127 for the installation of sensors, which are described below. The fluid 126 returning from the wellbore may be a three phase fluid: liquid, gas and solids. Any gas flows above the fluid line 127. Some solids settle at the flow line 130. The fluid 126 from the return line 130 passes to a shaker that removes the cuttings 124. The fluid 126 is then processed in a processor 145 and passed to an active pit 140 that serves as the source of the clean fluid 120.

In the present invention, a suitable flow sensor 150 mounted on a floating carrier or vessel 155 is pivotally installed at a pivot point 156. An adjustable counter weight 158 compensates for the weight of the carrier 155 to avoid the effect of extensive turbulence caused by the profile of the fluid 126 below the carrier 155. One or more height sensors such as sensor 161*a*–161*c* are installed at suitable locations in the riser 128 and the flow line 130. A mud weight out sensor 165 is suitably installed in the riser 128 which provides measurements for determining the density of the fluid 126 returning into the flow line 130.

The returning fluid 126 enters the riser 128 and then flows into the line 130. The fluid 126 is somewhat turbulent in the initial section (designated as I) of the flow line 130. The fluid 126 tends to settle there after. Flow sensor installed in the section II of the flow line 130 tend to provide relatively accurate measurements because of minimal reading interference from the solids 124 settled at the bottom of the flow line 130 or any gas 125 present above the fluid line 127. Accordingly, flow sensors are preferably installed in the section II of the flow line 130.

A separate flow in sensor is preferably installed to determine the output of each pump 135*a*–135*c*. In the system 100, sensors 160*a*–160*c* respectively placed in the in-flow lines 136*a*–136*c* provide fluid output of each of the pumps 135*a*–135*c*. Alternatively, the sensors 160*a*–160*c* may be installed in the output lines 137*a*–137*c*. Any suitable sensor may be used for measuring the flow through the pumps 135*a*–135*c*.

As noted above, one of the primary functions of the drilling fluid 120 is the control of the formation pressure. The hydrostatic pressure exerted by the mud column 180 is maintained above the pressure of the formation 170. This is controlled by the density of the drilling fluid 120. Drilling fluids also contain a variety of additives. Drilling fluids are selected based on the desired characteristics relating to the density, viscosity, cutting carrying capacity, corrosion resistance, etc. Both water-based and oil-based drilling fluids are used depending upon the specific application. If the formation pressure exceeds the pressure exerted by the mud column 180, formation fluid 182 may enter the wellbore 110, causing a kick, which is any unscheduled entry of formation fluid into the wellbore 100. This results in a gain in the flow rate of the returning fluid 126. Additionally, the drilling fluid may incur losses due to the presence of a fracture in the formation 170, such as fracture 184. This results in loss of the drilling fluid, which results in a loss of the fluid flow rate at the surface. It is important to continuously monitor for the pressure of kicks and the fracture during drilling of wellbores. The system of the present invention continuously monitors the flow rates as described below.

As noted above, flow measurements have been used to determine kick and wash out and other parameters. However, oil-based muds are not conducive to the use of commonly used electromagnetic sensors because they require conductive medium and are not practical when oil content in the mud is relatively high (typically greater than sixty percent (60%). The present invention provides novel sensor arrangements that may be utilized in the fluid flow system of FIG. 1 to provide relatively accurate measurements regardless of the type of the mud used, as described below.

Figure 2:
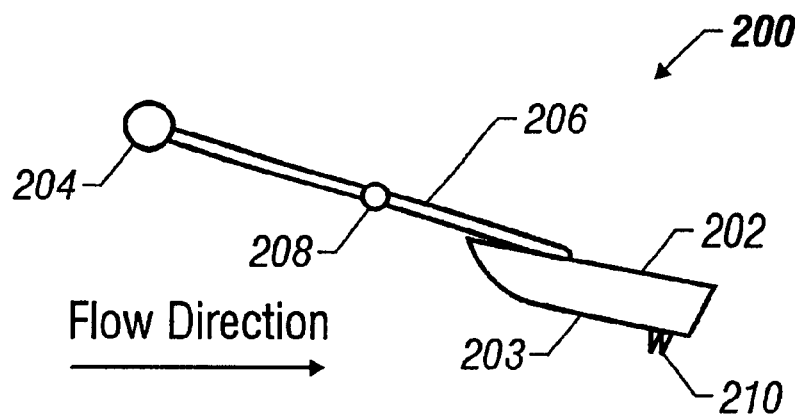
FIG. 2 is a schematic elevational diagram of a sensor assembly with floating sensor carrier for measuring the fluid velocity in the system of FIG. 1.

FIG. 2 shows an elevational view of a fluid flow measurement sensor arrangement or assembly 200 for use in the out-flow line, such as line 130 of FIG. 1. The sensor assembly 200 includes a floatable carrier or vessel 202 that carries a desired sensor or sensor probe 210. A counter weight 204 is connected to the vessel via a rod 206. A pivot 208 is provided between the counter weight 204 and the vessel.

Figure 3:
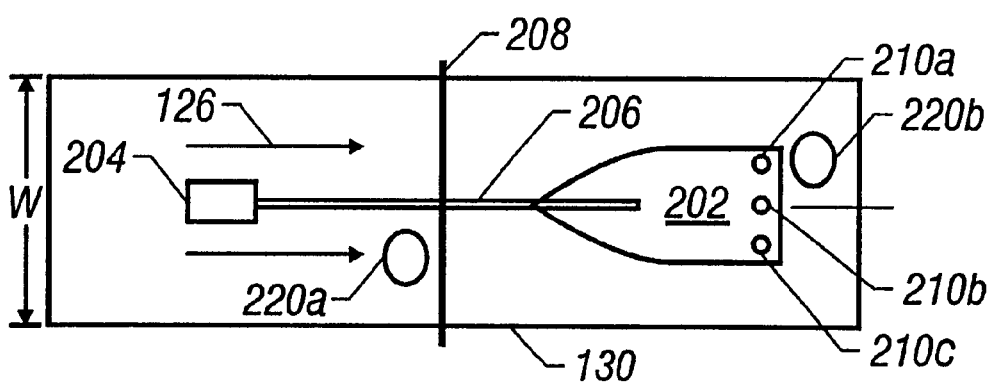
FIG. 3 is a schematic plan view of the discharge flow line with a sensor assembly of FIG. 2 carrying a plurality of flow measurement sensors and a plurality of height sensors.

FIG. 3 shows a plan view of a sensor assembly 200 placed in an out-flow line 130 (of FIG. 1). The assembly 200 is attached into the flow line 130 at the pivot 208. The bottom 203 of the vessel 202 rests on the return fluid 126. The counter weight 204 is adjustable and it compensates for the weight of the carrier 202 to avoid the affect of extensive turbulences caused by the underwater vessel profile. Multiple spaced apart sensors or probes 210a–210c are preferably used to increase the accuracy of the measurements especially in wider flow lines or in turbulent or in homogenous flow profiles. The sensors 210a–210c are preferably placed along the width "w" of the flow line 130 to account of varying fluid velocities along the fluid surface. A plurality of spaced apart height sensors 220a–220b are suitably placed in the flow line 130 to accurately determine the fluid level "h" in the flow line 130.

In the present invention, thermal sensors or ultrasonic probes may be utilized in the out-flow line to determine the velocity of any type of the drilling fluid passing through the out-flow line 130, including water-based and oil-based muds for both water-based or oil-based muds. An electromagnetic sensor may be used for water-based muds. Alternatively, combinations of such sensors may be utilized. For example, a thermal sensor arrangement and an electromagnetic arrangement may be used.

Figure 4:
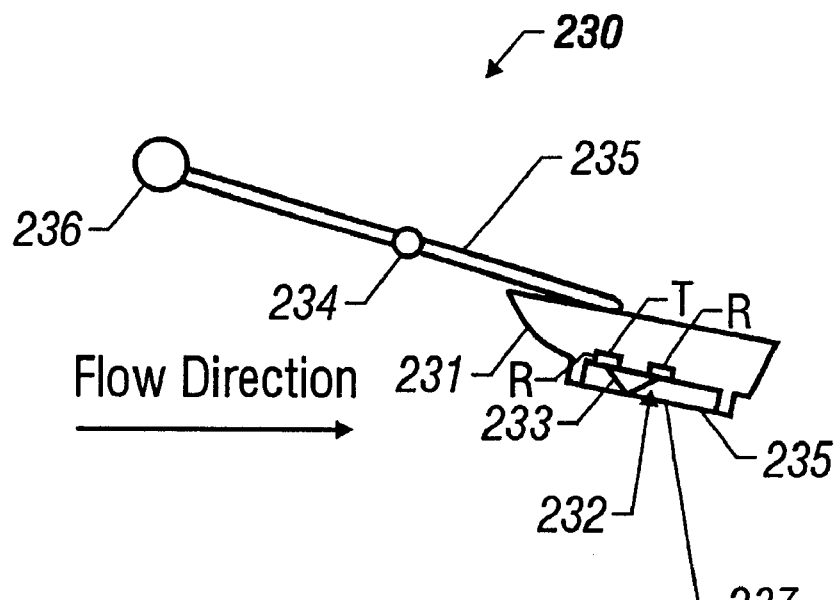
FIG. 4 is a schematic diagram of a sensor assembly carrying an ultrasonic sensor for measuring fluid velocity.
Figure 5:
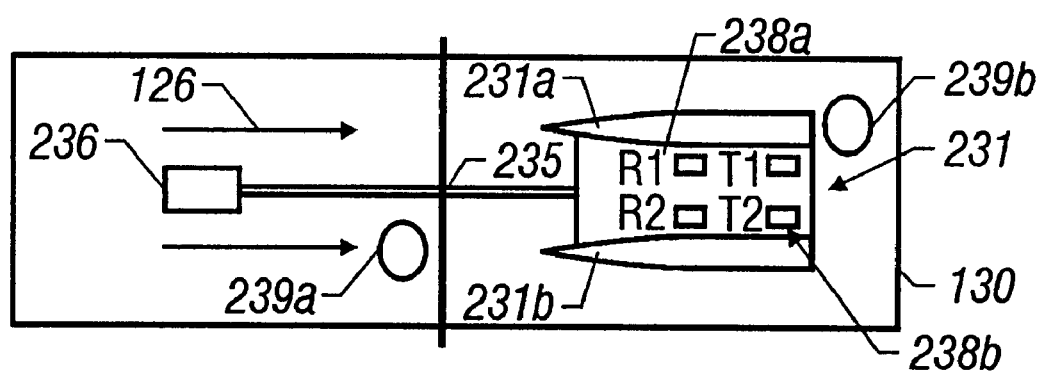
FIG. 5 is a plan view of a flow line with the ultrasonic sensor of FIG. 4 installed therein.

FIG. 4 shows an elevational view of an ultrasonic sensor arrangement 230 for measuring fluid flow rate. FIG. 5 shows the placement of the sensor 230 in the flow line 130 (FIG. 1.) The sensor arrangement or assembly 230 includes a floating carrier or vessel 231 which preferably has a pair of parallel, spaced apart and vertically extending members 231a and 231b underneath the vessel 231. The members 231a and 231b are preferably arranged in catiamoror-like manner.

One or more ultrasonic sensors, such as sensor 232, are carried by the vessel 231. The sensor 232 includes a transmitter T and a receiver R longitudinally spaced a predetermined distance from each other. The transmitter T transmits ultrasonic signals which are reflected by a reflector 273. The reflected signals are detected by the receiver R. The time lapse between the transmitted and received signals provides a measure of the velocity of the fluid 126 (FIG. 1). The circuit and methods for using such sensors are known and are thus not described herein. The sensor arrangement 230 includes a pivot 234 and a counter weight 236, which perform the same functions as described with respect to the sensors of FIG. 2.

FIG. 5 shows the placement of two ultrasonic sensors 238a and 238b in the vessel 231. The sensor 238a includes a transmitter $T_1$ and a receiver $R_1$ while sensor 238b has a transmitter $T_2$ and a receiver $R_2$. The transmitters $T_1$ and $T_2$ are preferably fixed sequentially. The detected signals from $R_1$ and $R_2$ may be combined to improve accuracy of the measurement. Multiple height sensors 239a and 239b are also provided to determine the level of the fluid in the line 130.

Figure 6:
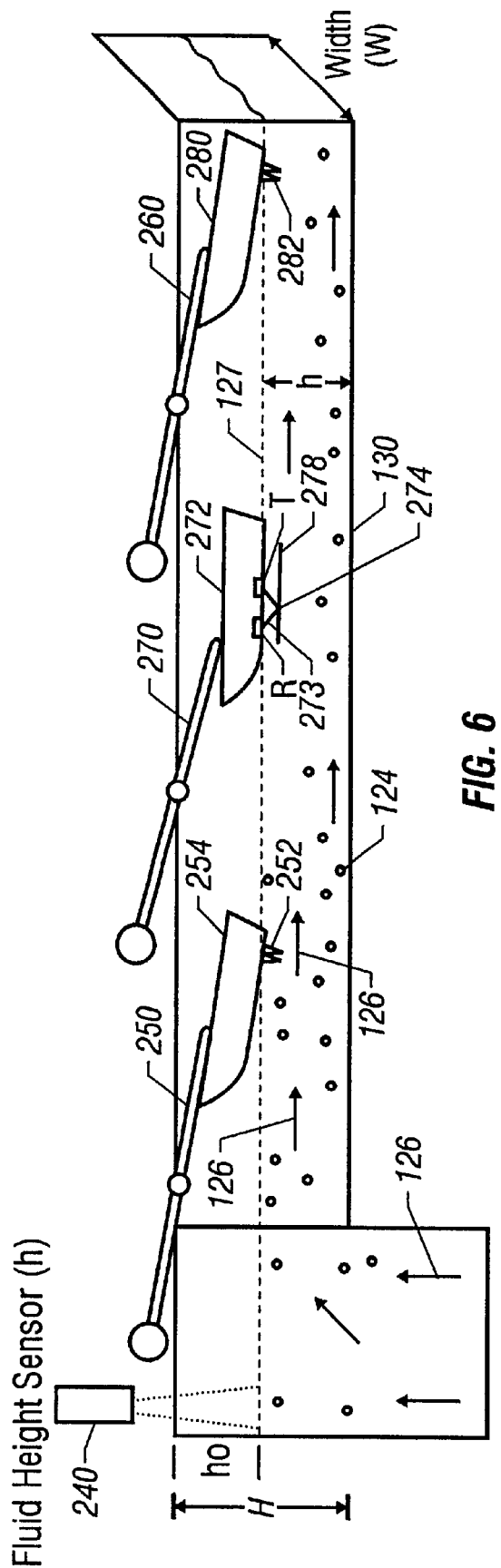
FIG. 6 is a schematic elevational view of the out flow or return line showing placements of different types of flow measuring sensors in the out flow line.

FIG. 6 shows an example of the placement of the floaters carrying different types of sensors in the out-flow line 130. When a thermal sensor arrangement, such as 250 is disposed in the flow line 130, the thermal probes 252 extending from the bottom of the carrier 254 penetrate a certain distance below the fluid line 127. As the velocity of the fluid 126 changes, the output signal of the sensors 252 is used by a controller at the wellsite to determine the fluid velocity. If more than one probe is used, as show in FIG. 3, their signals may be combined to determine the average fluid velocity. The height sensor 240, which may be an ultrasonic sensor, provides the height ho. Since the height H of the flow line 130 is known, the fluid level h can easily be determined as h=H *ha. From the fluid level "h" and the width "w", the flow rate is determined as: Flow rate =(w *h) * v, where velocity "v" is the velocity of the fluid in the flow line 130. Alternatively, or in addition to the thermal probes 252, ultrasonic probes may be used as shown by the assembly 270. Each such sensor 274 is carried by the vessel 272. Each sensor 274 includes a transmitter "T" and a receiver "R" axially disposed, i.e., along the direction of the flow. The transmitter is energized periodically to induce an ultrasonic signals in the fluid. The transmitter signal is reflected at a certain depth 278 and is detected by the receiver R. The time lapse varies as a function of the fluid velocity. A controller at the wellsite utilizes the signals from the sensor 274 to determine the flow rate.

In some cases, it may be desirable to use an electromagnetic sensor 282. Such sensors are commercially used to measure the flow rate of water-based muds. However, it is advantageous to mount such sensors in a vessel 280 to provide stability.

The system described in FIG. 1 relates to flow of fluid during a drilling operation, which is the primary pump mode. As described above, mud pumps 135a–135c are used to pump drilling fluid in the wellbore. Such pumps are relatively large (often greater than 500 HP capacity). A secondary pump mode is during tripping of the drilling string out of the wellbore. Tripping operations are required to change drilling assembly components, change drill bit or for a variety of other reasons. During tripping, the main mud pumps 135a–135c are turned off. To compensate for the loss of fluid volume in the wellbore due to the gradual removal of the drill string 115 and more importantly to maintain the desired hydrostatic pressure on the formation 170, a secondary fluid pump is utilized to pump the drilling fluid into the wellbore annulus 122.

Figure 7:
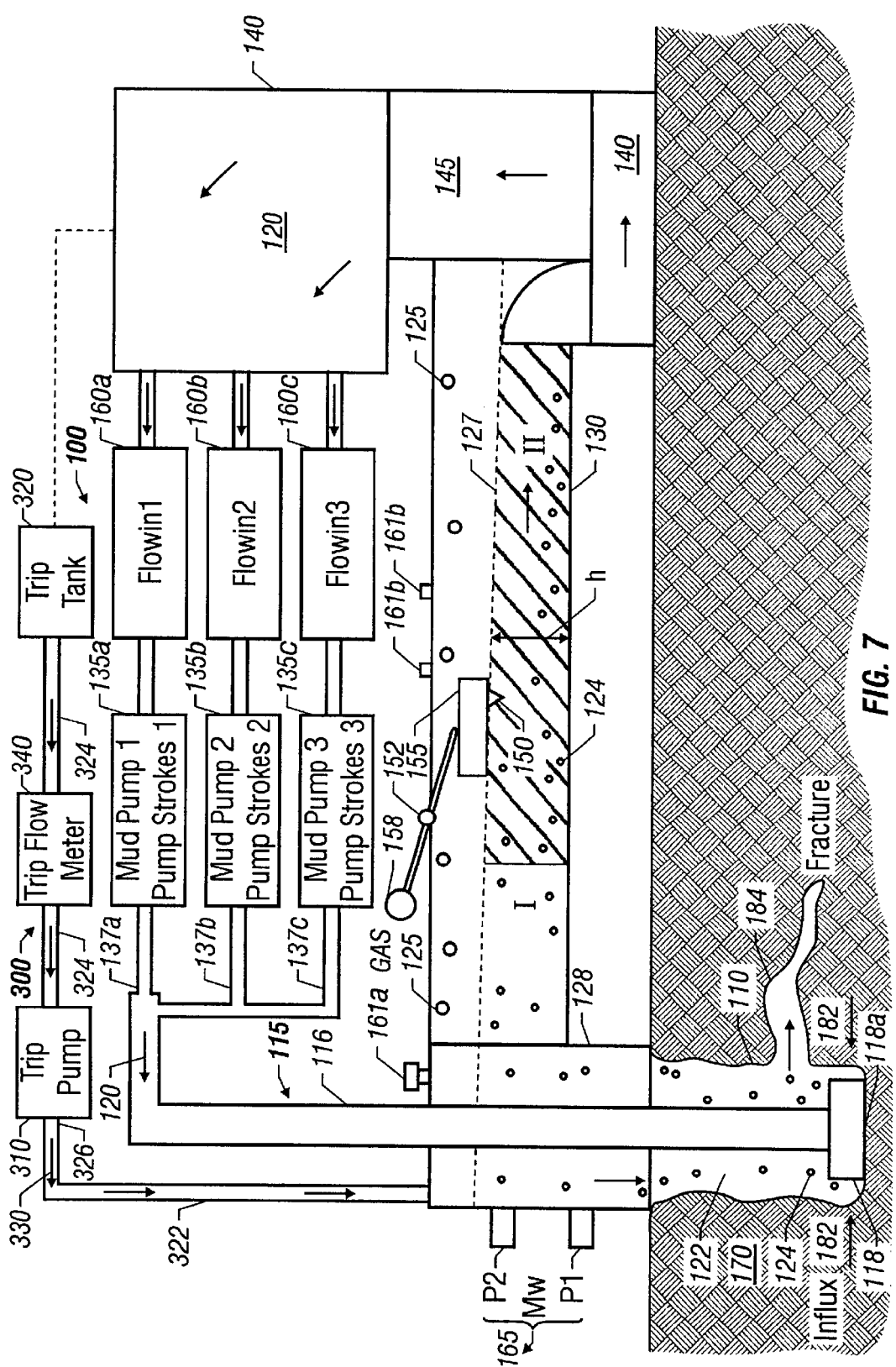
FIG. 7 is the system of FIG. 1 with a secondary pump during tripping operation and an associated flow meter according to the present invention for determining fluid volume entering the wellbore.

FIG. 7 shows the system 100 of FIG. 1 with a secondary fluid inflow system 300. This secondary or trip inflow system includes a secondary pump or trip pump 310 that pumps drilling fluid 330 from a trip tank 320 into the annulus 122 of the wellbore 110 via a supply line 322. The trip pump 310 is usually much smaller than the main mud pumps 135a–135c because the fluid volume pumped in during tripping is relatively small. The trip pump 310 may be arranged to pump fluid from the tank 120, eliminating the need for a separate trip tank 320. A flow measuring apparatus 340 (also referred to herein as a trip flow meter) is connected in line 324 between the trip tank 320 and the trip pump 310. The trip flow meter may also be installed in the horizontal section 326 of the line 322. The flow meter 340 provides the volume of the fluid pumped into the wellbore 110 during the tripping operation.

Figure 8:
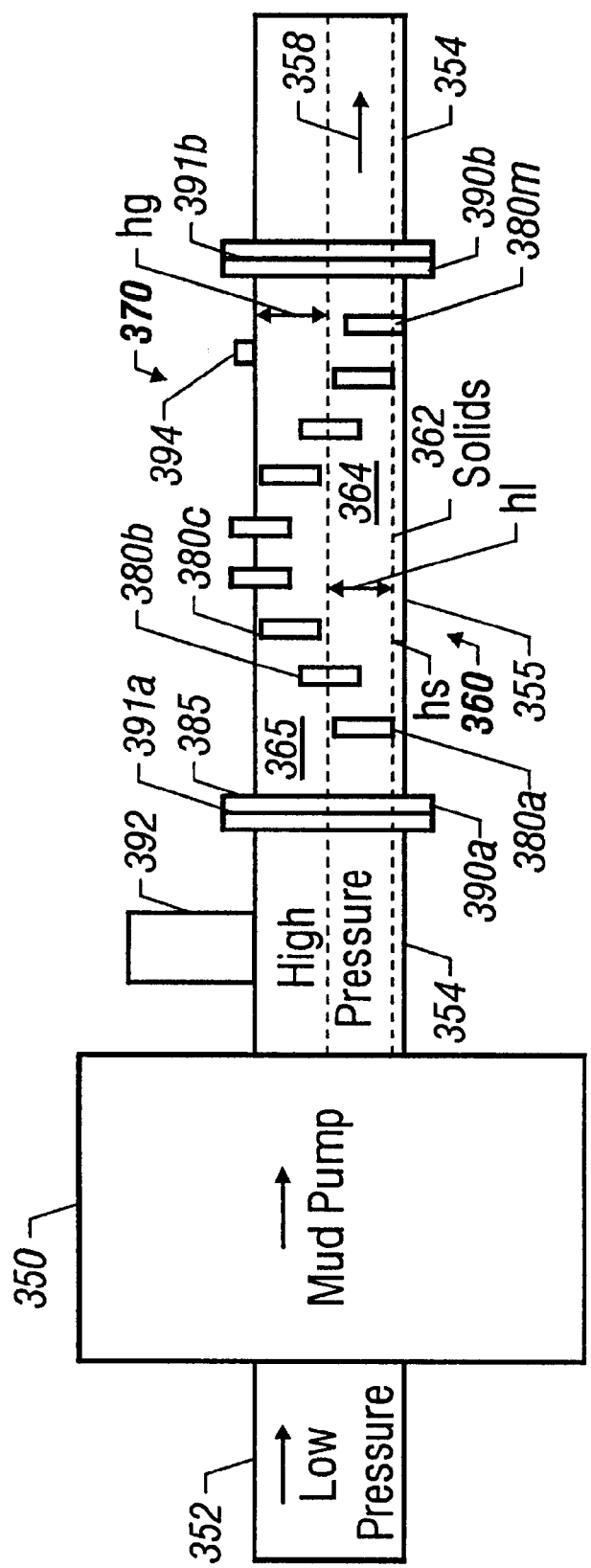
FIG. 8 is an embodiment of a flow measuring device for use in the flow line of the system of FIG. 1.

FIG. 8 is a schematic diagram of a flow measurement sensor arrangement for use in enclosed flowlines, such as used coiled tubing operations. FIG. 8 shows a mud pump 350 pumping drilling fluid from a low pressure side 352 (mud pit side) into an enclosed flowline 354 on the high pressure side (wellbore side). The line 354 has a circular cross-section. The fluid 358 in the line 354 may be a three phase mixture that contains solid particulates 362, liquid phase 364 and gas 365. The present invention provides a sensor arrangement 370 for accurately measuring the volume of mass flowing through the line 354 as a function of or liquid, gas and solids in the line 354. The sensor arrangement 370 includes a plurality of flow measuring sensor 380a–380m circularly arranged in a section 355 of the line 354. Alternatively, the sensor arrangement may be contained in a subassembly 385 that mates with the line 354 at ends 390a and 390b by any suitable attaching mechanisms 391a and 391b. The sensors 380a–380m are arranged with the section 355. Thermal sensors are preferably used, which are mounted in any suitable manner. Such an arrangement provides the velocity of each of the three phases and a sufficient number of sensors can be used to obtain multiple velocity measurements for each phase to improve accuracy of the measurements. One or more height sensors, such as sensor 394, are installed in the section 355 to determine the height of the gas $h_g$ the level of the solids $h_s$ in the bottom of the section 355 and the liquid height $h_l$. A pressure sensor 392 provides the pressure the line 354. The total volume through the section 355 is calculated from the flow measurement of the various phases by using volumetric calculations well known in the art. The subassembly 385 may be retrofitted in existing lines.

Figure 9:
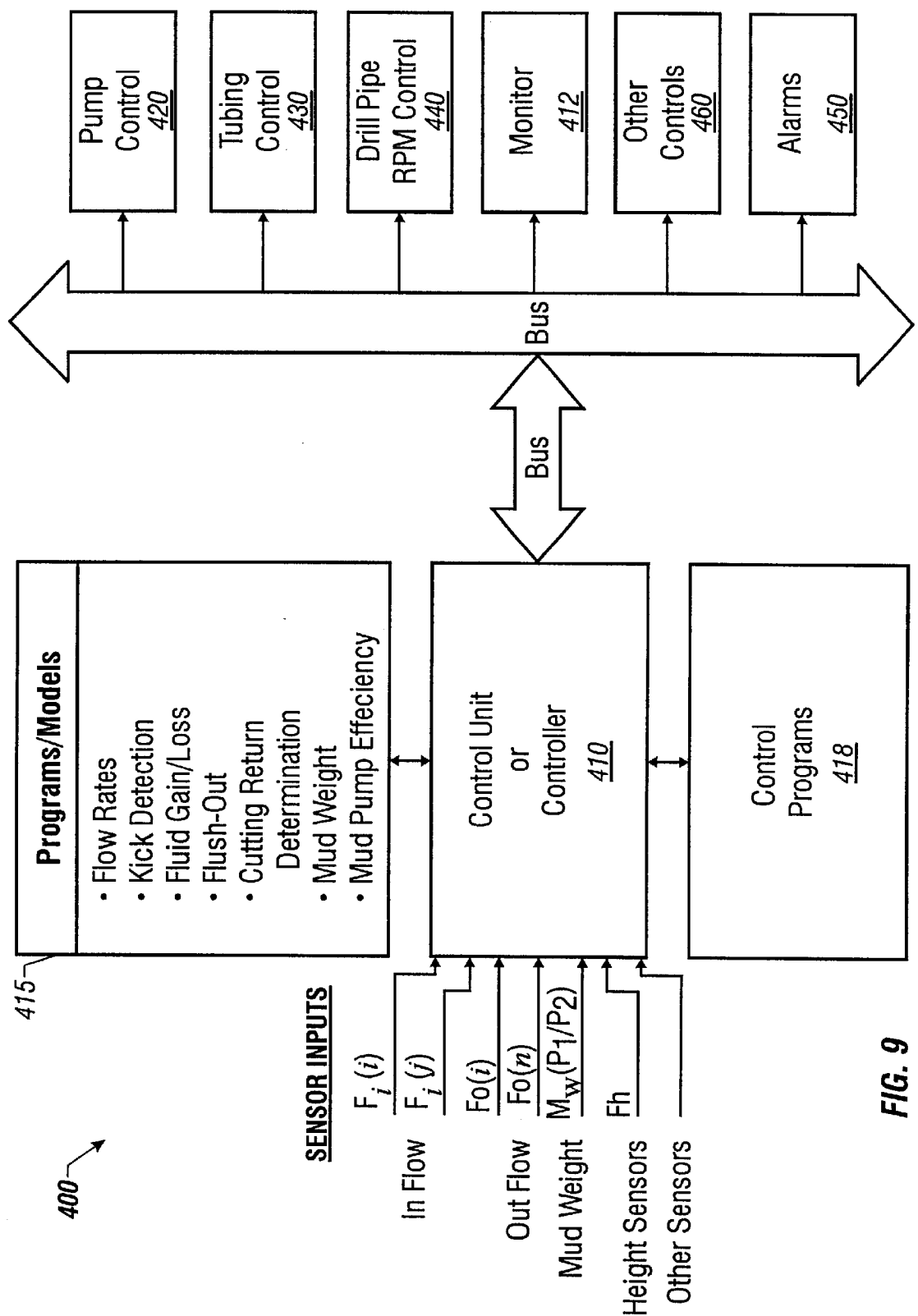
FIG. 9 is a block functional diagram of a controller that determines the various parameters of interest of the fluid flow system of FIG. 1 and controls the operation of certain devices of the system in response to the determined parameters.

In the present invention, the signals from the various flow measurement sensors are preferably processed by a control unit or controller at the wellsite. FIG. 9 shows a functional block diagram of a control system 400 for determining the various flow parameters of the system 100 of FIG. 1. The controller preferably is a computer system or an microprocessor-based system programmed to perform desired data manipulation to provide information about selected parameters of interest and to take certain desired actions. The parameters of interest may include; the amount of fluid pumped by each pump of the system, the amount of fluid returning to the surface, the difference between the in-flow and the out-flow of the drilling fluid, the presence of a kick or a flush-out, and the density of the fluid entering and leaving the wellbore.

Referring to FIGS. 1 and 7, the controller 410 receives signals from the inflow sensors Fi(i)–Fi(j), out-flow sensors Fo(i)–Fo(n), mud weight sensors Mw, the height sensor Fh and any other desired sensor. The controller utilizes the program 418 provided thereto and determines the fluid output of each pump 135a–135c, the mud weight Mw the fluid height "h", the fluid velocity "v" and the flow rate of the fluid leaving the wellbore. The controller also determines from the gain or loss in the fluid, whether there is a kick or a wash out. The controller can be programmed to control any of the drilling system elements, such as pumps 420, tubing insertion rate 430, and drill pipe rotation 440. The controller also may be programmed to activate alarms 450 if any unwanted condition, such as the presence of a kick, is detected. Such information may also be displayed on a suitable monitor 412. The controller utilizes the control programs 418 to determine the course of action. It may be programmed to shut down the drilling operation, or pumps.

The output of each pump may also be used to determine the efficiency of each pump. The pump efficiency is calculated real time to assess the pump wear and to observe ar, upcoming pump failure. Following relationship may be utilized to determine the pump efficiency. On-line pump Efficiency=flow inl(Pump capacity pump rate).

The present system is capable of providing accurate measures of the changes in the fluid in-flow and out-flow rates which enables he use of a gain/loss detection system. Such a system recognized relatively low flow differences between fluid in-flow and out-flow rates and considers the dynamic effects of the fluid systems different operating processes, i.e., tripping pipe, reaming or drilling. The program accounts for or compensates for the various aspects of the operations that inherently cause fluid flow changes such as pipe movement, rig heave (in the case of marine rigs) and switching pumps on or off to avoid for false alarms.

As noted above, the system of the invention determines on-line drill pipe washout conditions. The controller 410 calculates the stand pipe pressure from the known flow in rate and a suitable hydraulic model, which are known in the art. The comparison between the calculated value with the measured value provides indications of drill pipe wash out. The high accurate flow in measurement is required for a real time hydraulic technique to calculate parameters such as the equivalent circulating density at the drill bit or the casing shoe, drill string pressure losses, and hole cleaning quality.

To assess the cuttings removal performance, the flow in and flow out values are used to calculate the cutre factor "K" in the following relationship.

$$K=4(q\ out*p\ out-q\ in*p\ in)/(ROP*OD^2*\pi*p\ cuttings)$$

where ROP is the rate of penetration, OD is the bit outer diameter, p is the density of the fluid mixture and q is the flow rate. The unit volume removed is compared to the unit volume measured. A cutre factor greater than one identifies hole washout and a cutre factor less than one indicates hole cleaning. The mud weight Mw is calculated from the pressure difference between the sensors P1 and P2 installed a fixed vertical distance apart in the riser 128. Thus, the fluid flow system of the present invention provides on-line determination of the parameters of interest noted above and takes selective corrective actions based on the models or programs provided to the system.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. A drilling system having a fluid flow monitoring apparatus, comprising an inflow line supplying fluid under pressure into a wellbore, a return line having a known cross-sectional area carrying fluid returning from the wellbore, and a sensor assembly disposed in the return line, the sensor assembly including a floatable carrier placed on the fluid in the return line, the carrier carrying a first flow rate sensor for providing measurements representative of the velocity of the fluid flowing through the return line.

2. The system of claim 1, wherein the first flow rate sensor is selected from a group consisting of (i) a thermal sensor, (ii) an electromagnetic sensor, and (iii) an ultrasonic sensor.

3. The system of claim 1, wherein a probe element of said first flow rate sensor remains in contact with the fluid.

4. The system of claim 1, wherein the first flow rate sensor includes at least two spaced apart sensors, each such sensor providing a separate signal representative of the velocity of the fluid.

5. The system of claim 1, wherein the sensor assembly is side-mounted about a pivot point.

6. The system of claim 5, wherein the sensor assembly includes a counter weight to the carrier.

7. The system of claim 1, further comprising a second sensor associated with the return line for providing measurements representative of the fluid level in the return line.

8. The system of claim 7, further including a controller, the controller determining from the first flow rate sensor measurement and the second sensor measurement the flow rate of the fluid returning from the wellbore.

9. The system of claim 8, further comprising a third sensor associated with the inflow line providing measurements representative of the flow rate of the fluid supplied to the wellbore.

10. The system of claim 9, wherein the controller determines from the third sensor measurements the flow rate of the fluid supplied to the wellbore.

11. The system of claim 10, wherein the controller determines from the inflow rate and the outflow rate at least one of (a) presence of a kick, and (b) presence of a hole wash out.

12. The system of claim 7, further comprising a third sensor for determining the density of the fluid returning from the wellbore.

13. The system of claim 1, further comprising:
(i) a pump in the inflow line for pumping the fluid into the wellbore; and
(ii) a second sensor in the inflow line for providing measurement of the fluid pumped by the pump.

14. The system of claim 13, further comprising a controller for determining a measure of the performance of the pump from the measurements of the second sensor.

15. The system of claim 14, wherein the measure of performance is one of (i) efficiency of the pump, (ii) wear on the pump, (iii) remaining life of the pump, (iv) an indication of need to perform service on the pump.

16. The system of claim 13, wherein the second sensor is one of (i) a thermal sensor, (ii) an electromagnetic sensor, (iii) and an ultrasonic sensor.

17. The system of claim 1, wherein the return line is substantially horizontal.

18. The system of claim 1, wherein the return line has an inclination of less than 25 degrees (25°).

19. A method of determining a parameter of interest of a drilling system having an inflow line supplying fluid under pressure into a wellbore and a return line carrying fluid returning from the wellbore, the method comprising:
(a) passing the return fluid through a substantially horizontal section of the return line, the horizontal section having a known cross-sectional area;
(b) placing a sensor assembly including a floatable carrier on the return fluid in the horizontal section;
(c) providing measurements representative of the velocity of the fluid flowing through the return line using a first flow rate sensor on the carrier; and
(d) using a controller to determine the parameter of interest from the provided measurements.

20. The method of claim 19 wherein the first flow rate sensor is selected from a group consisting of (i) a temperature sensor, (ii) an electromagnetic sensor, and (iii) an ultrasonic sensor.

21. The method of claim 19 further comprising using a second sensor to provide additional measurements representative of the flow rate of the fluid supplied to the wellbore and using the additional measurements to determine the parameter of interest.

* * * * *

UNITED STATES PATENT AND TRADEMARK OFFICE
CERTIFICATE OF CORRECTION

PATENT NO. : 6,257,354 B1
DATED : July 10, 2001
INVENTOR(S) : Hartmut Schrader et al.

It is certified that error appears in the above-identified patent and that said Letters Patent is hereby corrected as shown below:

Column 5,
Line 53, please delete "catiamoror" and insert therefor -- catamaran --.

Column 6,
Line 23, please delete "h=H *ha" and insert therefor -- $h=H-h_0$ --.

Signed and Sealed this

Seventh Day of May, 2002

Attest:

Attesting Officer

JAMES E. ROGAN
*Director of the United States Patent and Trademark Office*